United States Patent [19]

Sprague

[11] Patent Number: 5,699,458
[45] Date of Patent: Dec. 16, 1997

[54] EFFICIENT BROWSING OF ENCODED IMAGES

[75] Inventor: David L. Sprague, Gilbert, Ariz.

[73] Assignee: Intel Corporation, Santa Clara, Calif.

[21] Appl. No.: 496,539

[22] Filed: Jun. 29, 1995

[51] Int. Cl.$^6$ .................................................. H04N 7/30
[52] U.S. Cl. ...................... 382/250; 348/408; 364/715.02
[58] Field of Search ............................... 382/250, 248, 382/235, 245, 246, 251; 348/408, 403, 395, 393, 391, 390; 364/715.02, 920.7; 345/202

[56] References Cited

U.S. PATENT DOCUMENTS

| | | | |
|---|---|---|---|
| 5,164,831 | 11/1992 | Kuchta et al. | 358/209 |
| 5,412,429 | 5/1995 | Glover | 348/398 |
| 5,434,567 | 7/1995 | Mack et al. | 341/50 |
| 5,450,209 | 9/1995 | Niimura et al. | 358/335 |
| 5,552,832 | 9/1996 | Astle | 348/420 |

FOREIGN PATENT DOCUMENTS

WO 94/22108  9/1994  WIPO .............................. G06K 9/36

*Primary Examiner*—Douglas W. Olms
*Assistant Examiner*—Matthew C. Phillips
*Attorney, Agent, or Firm*—William H. Murray; N. Stephan Kinsella

[57] ABSTRACT

A computer-implemented method and system for browsing encoded images. According to a preferred embodiment, at least one image is encoded with an encoding system to provide at least one encoded image. The encoding includes transforming images of the at least one image in accordance with a transform to provide a plurality of transform coefficients. A subset of the plurality of transform coefficients corresponding to a selected image is transmitted to a remote computer system, wherein the subset of the plurality of transform coefficients corresponds to a low quality version of the selected image.

24 Claims, 6 Drawing Sheets

ENCODE PROCESSING

FIGURE 2. DECODING SYSTEM

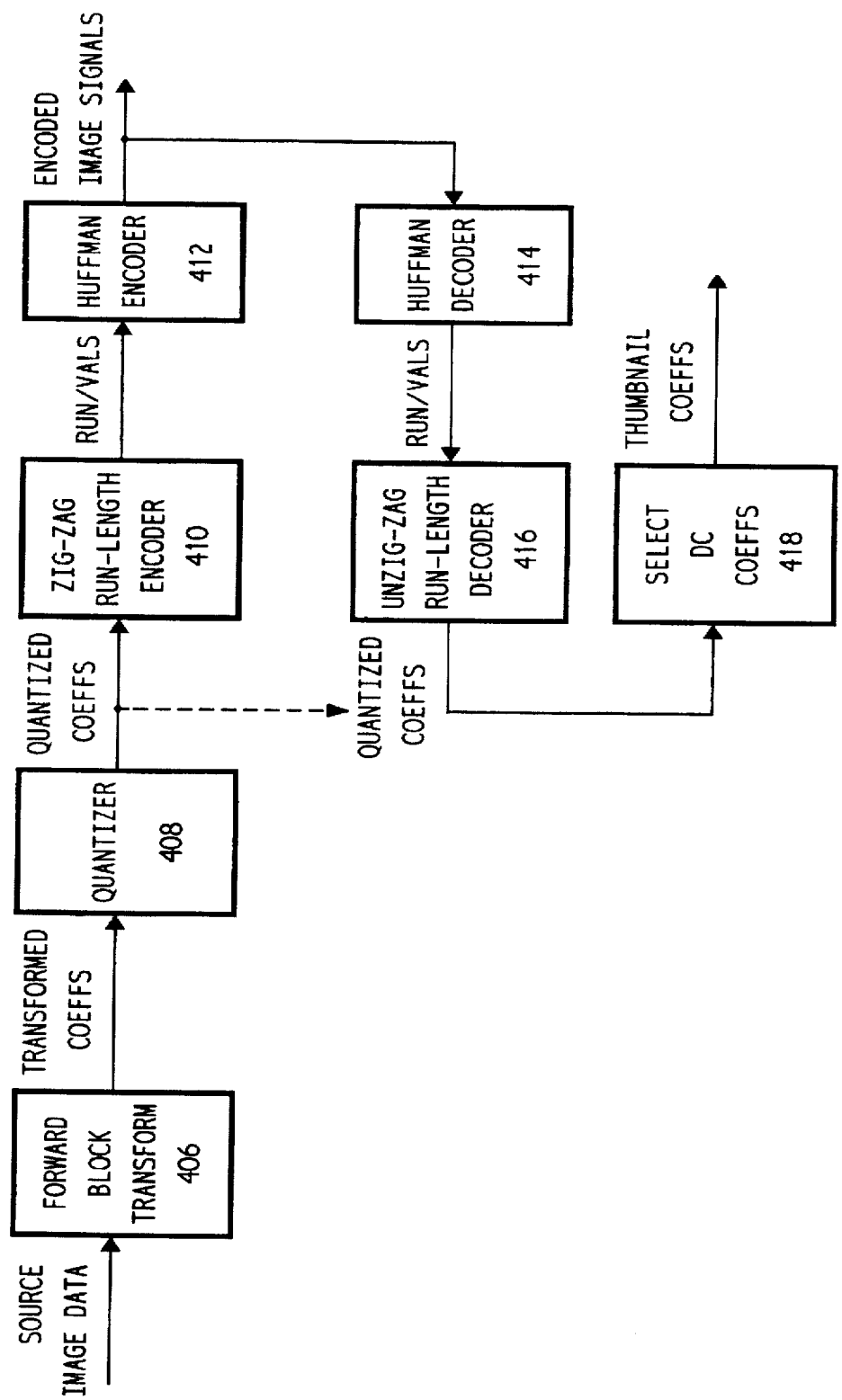
FIG. 4. ENCODE PROCESSING

FIGURE 5. ZIG-ZAG SCAN SEQUENCE

| 0 | 1 | 5 | 6 | 14 | 15 | 27 | 28 |
|---|---|---|---|----|----|----|----|
| 2 | 4 | 7 | 13 | 16 | 26 | 29 | 42 |
| 3 | 8 | 12 | 17 | 25 | 30 | 41 | 43 |
| 9 | 11 | 18 | 24 | 31 | 40 | 44 | 53 |
| 10 | 19 | 23 | 32 | 39 | 45 | 52 | 54 |
| 20 | 22 | 33 | 38 | 46 | 51 | 55 | 60 |
| 21 | 34 | 37 | 47 | 50 | 56 | 59 | 61 |
| 35 | 36 | 48 | 49 | 57 | 58 | 62 | 63 |

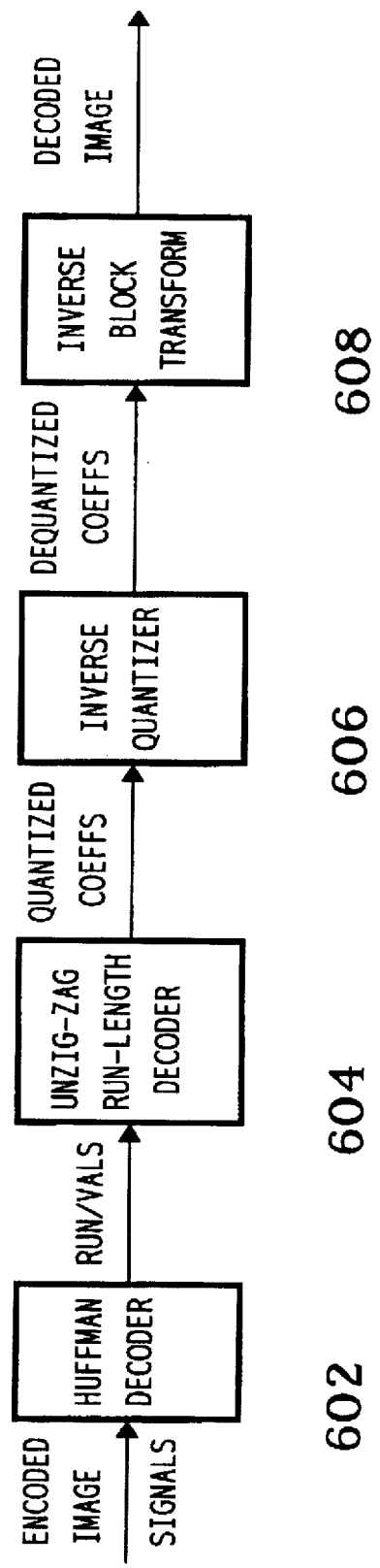
FIG. 6. DECODE PROCESSING

EFFICIENT BROWSING OF ENCODED IMAGES

BACKGROUND OF THE INVENTION

1. Field of the Invention

The present invention relates to video processing and, in particular, to computer-implemented processes and apparatuses for efficient browsing of encoded images.

2. Description of the Related Art

The World Wide Web (WWW) is a hypertext document network implemented on top of the internet. It allows hypertext linking of multimedia documents containing text, sound, images, and video across computers connected to the internet world wide. Other information services such as CompuServe™, America Online™, and countless Bulletin Board Services (BBS's) also have large databases of still images. Many of the still images included in such databases are encoded using the Joint Photographic Experts Group (JPEG) standard which is an international Organization for Standardization (ISO) standard for compression of still images based on discrete cosine transform (DCT), quantization, and entropy coding (ISO Draft International Standard 10918-1). The JPEG standard is described in William B. Pennebaker & Joan L. Mitchell, *JPEG: Still Image Data Compression Standard* (New York: Van Nostrand Reinhold, 1993), the entirety of which is incorporated herein by reference.

Graphics interface format (GIF) has been a widely used file format for image databases and is still used today for efficient coding of images with few colors such as logos, weather maps, and other images with limited a limited set of colors. JPEG, however, is rapidly becoming a standard format for full color still image compression and decompression.

Image data may be transmitted to one or more remote signal processing systems such as video conferencing nodes which decode the encoded signals, or a personal computer communicating remotely with a host computer of a computer or BBS service. Video conferencing or other nodes may be personal computer (PC)-based systems communicating with each other over a selected transmission medium. Possible transmission media include Integrated Services Digital Network (ISDN) and Public Switched Telephone Network (PSTN) telephone connections. Although ISDN connections provide a higher bandwidth than PSTN connections, ISDN connections are currently less readily available and more expensive than PSTN connections.

Because of limited bandwidth availability on many connections, whether by network connection or by modem connection, browsing these multimedia documents or images in general can be inconveniently slow due to the need to transmit the entire JPEG encoded image as the user scrolls through the document, or as the user requests another image to be browsed or viewed.

To avoid this problem, browsers for WWW and for other video or multimedia communications systems, including a very popular one called Mosaic which is available on Unix, Mac, and PC platforms, typically operate in one of two modes: either they (1) display an icon representing a particular image and only download the image when requested by the user, or (2) they store a separate GIF or other format version of the image that functions as a thumbnail image and requires less bandwidth to transmit. As will be understood, a thumbnail image is an image of lower resolution or quality than the original image from which it is derived, which consequently requires less bandwidth to transmit because it may be represented by fewer bits. Mode (1), utilizing an icon to represent an image and only transmitting the image upon request, presents the user with a limited range of options: either free up bandwidth but omit viewing the image, or choose to view the image at the cost of tying up communications channel bandwidth and enduring the delay of transmitting the image. Mode (2), storing separate GIF or other format versions of an image, involves the drawback of requiring extra storage space as well as the complexity of having extra layers of encoding and decoding formats.

What is needed, therefore, are computer-implemented processes and apparatuses for efficient browsing of encoded images that avoids these problems.

SUMMARY

There is provided herein a computer-implemented method and system for browsing encoded images. According to a preferred embodiment of the invention, at least one image is encoded with an encoding system to provide at least one encoded image. The encoding includes transforming images of the at least one image in accordance with a transform to provide a plurality of transform coefficients. A subset of the plurality of transform coefficients corresponding to a selected image is transmitted to a remote computer system, wherein the subset of the plurality of transform coefficients corresponds to a low quality version of the selected image.

BRIEF DESCRIPTION OF THE DRAWINGS

These and other features, aspects, and advantages of the present invention will become more fully apparent from the following description, appended claims, and accompanying drawings in which:

FIG. 4 is a block diagram of the encode processing of FIG. 3;

FIG. 5 shows the zig-zag scan sequence used in the encode processing of FIG. 3; and FIG. 6 is a block diagram of the decode processing of the decoding system of FIG. 2.

DESCRIPTION OF THE PREFERRED EMBODIMENT

This invention describes a method of efficiently requesting and receiving a lower resolution, thumbnail version of an image directly from the encoded file, to allow efficient browsing of such encoded images which are stored in a remotely-located computer system. The thumbnail version would provide sufficient detail for the user to determine if he or she wanted to see the full resolution image. The present invention can also be used for browsing image databases on other information services or computer communications systems such as conferencing systems. Methods and apparatuses for performing these functions are described in further detail hereinbelow.

Video Processing System Hardware

Figure 1:
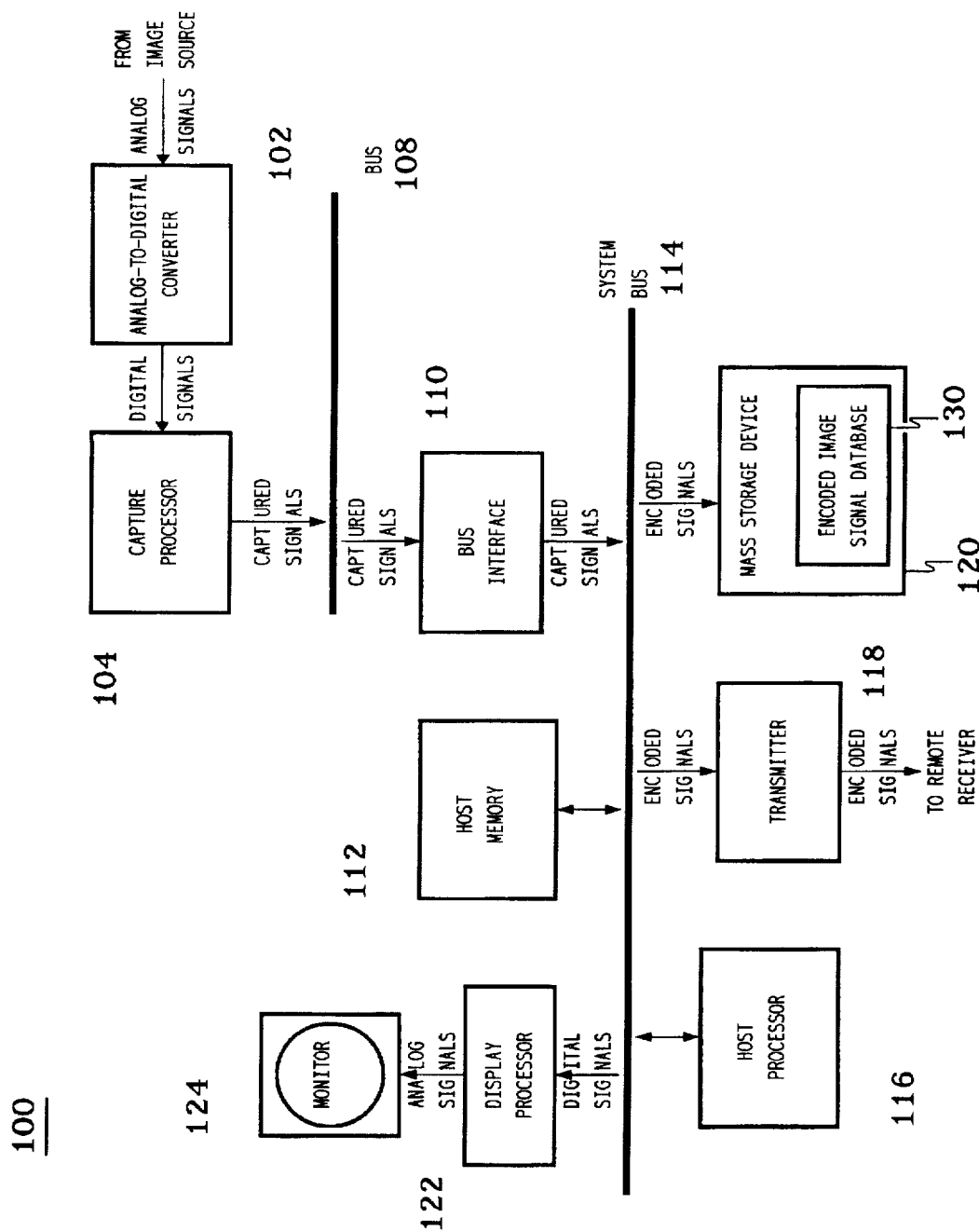
FIG. 1 is a computer-based encoding system for encoding image signals, according to a preferred embodiment of the present invention.

Referring now to FIG. 1, there is shown a computer-based encoding system 100 for encoding image signals, according to a preferred embodiment of the present invention. As will be understood, encoding system 100 may be a remote computer system storing an image database. Decoding system 200 (described below) may represent the computer system of a user who is remotely connected via a communications channel to encoding system 100. As will be understood, while decoding system 200 is communicating via the communications channel with encoding system 100, image signals representing various images stored within encoding system 100 may be transmitted to decoding system 200 for viewing or browsing by a user of decoding system 200, or for other image processing by decoding system 200.

Analog-to-digital (A/D) converter 102 of encoding system 100 receives analog image signals from an image source. The image source may be any suitable source of analog image signals such as a still or video camera or VCR for generating local analog image signals or a cable or antenna for receiving analog image signals from a remote source. A/D converter 102 decodes (i.e., separates the signal into constituent components) and digitizes each analog image into digital image component signals (e.g., in a preferred embodiment, Y, U, and V component signals).

Capture processor 104 receives, captures, and stores the digitized component signals as subsampled images in host memory 112 via bus 108, bus interface 110, and system bus 114. Each subsampled image is represented by a set of two-dimensional component planes or pixel bitmaps, one for each component of the digitized image signals. In a preferred embodiment, capture processor 104 captures image signals in a YUV4:1:1 format, in which every (4×4) block of pixels of the Y component plane corresponds to a single pixel in the U component plane and a single pixel in the V component plane.

Host processor 116 accesses captured bitmaps from host memory 112 via system bus 114 and generates encoded image signals that represent one or more of the captured images. Depending upon the particular encoding method implemented, host processor 116 applies a sequence of compression techniques to reduce the amount of data used to represent the information in each image. Host processor 116 stores the encoded image signals back to host memory 112 via system bus 114. Host processor 116 may transmit the encoded image signals to transmitter 118 for real-time transmission to a remote receiver (not shown in FIG. 1), store the encoded image signals to mass storage device 120 for future processing, or both. A plurality of encoded image signals stored within mass storage device 120 thus represent a database 130 of encoded image signals, representing various images or pictures. It will be understood that database 130 may comprise encoded image signals generated by means other than analog-to-digital converter 102, for example digitally-generated or processed still images. It will further be understood that host memory 112 or other suitable memory means may instead be utilized to store an image database. Additionally, a database of unencoded image signals may also be stored within a memory device such as mass storage device 120.

The encoding technique utilized by host processor 116 to compress the image signals is described in further detail hereinbelow in the section captioned "Encoding Processing".

In addition to encoding and transmitting image signals, display processor 122 may receive and process digital image signals for display in one or more windows on monitor 124. Display processor 122 converts the digital image signals to analog image signals. The images displayed on monitor 124 may correspond, for example, to raw captured images or companded images (i.e., the results of decoding the encoded images).

Figure 2:
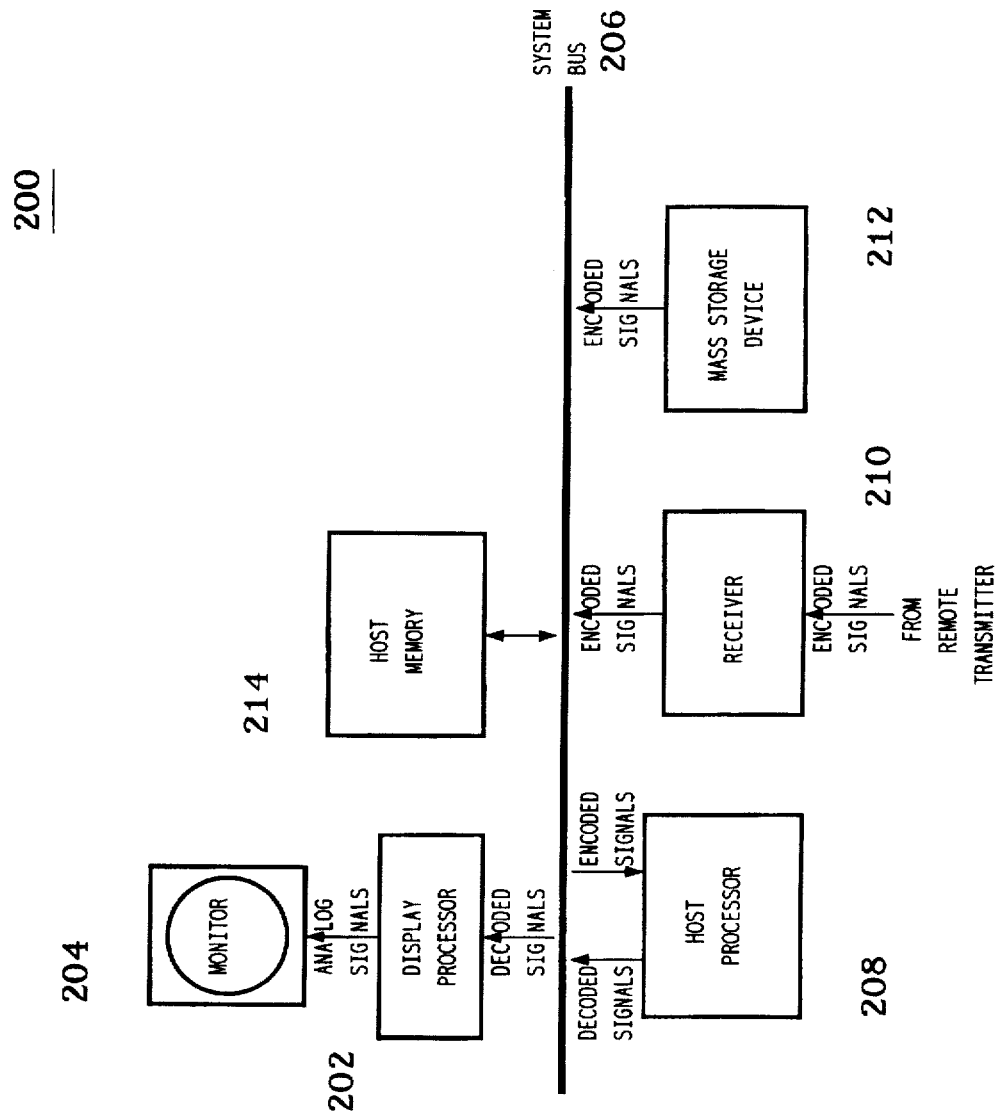
FIG. 2 is a computer-based decoding system for decoding the image signals encoded by the computer system of FIG. 1, according to a preferred embodiment of the present invention.

Referring now the FIG. 2, there is shown a computer-based decoding system 200 for decoding the image signals encoded by encoding system 100 of FIG. 1, according to a preferred embodiment of the present invention. Encoded image signals are transmitted from either mass storage device 212 or receiver 210 via system bus 206 for storage to host memory 214. Receiver 210 receives encoded image signals from a remote transmitter, such as transmitter 118 of FIG. 1.

Host processor 208 accesses the encoded image signals from host memory 214 via system bus 206. Host processor 208 decodes the encoded image signals and stores the decoded image signals back to host memory 214. Decoding the encoded image signals involves undoing the compression processing implemented by host processor 116 of encoding system 100 of FIG. 1. The decoded image signals are then transmitted to display processor 202 via system bus 206. Display processor 202 converts the digital decoded image signals to analog image signals for display on monitor 204.

Referring again to FIG. 1, encoding system 100 is preferably a general microprocessor-based personal computer (PC) system with a special-purpose image capture plug-in board. In particular, A/D converter 102 may be any suitable means for decoding and digitizing analog video image signals. Capture processor 104 may be any suitable processor for capturing digitized video image component signals as subsampled frames. Bus 108 may be any suitable digital signal transfer device and is preferably a peripheral component interconnect (PCI) bus. Alternatively, bus 108 may be an Industry Standard Architecture (ISA) bus or Extended ISA (EISA) bus. Bus interface 110 may be any suitable means for interfacing between bus 108 and system bus 114. In a preferred embodiment, A/D converter 102, capture processor 104, bus 108, and bus interface 110 are contained in a single plug-in board, such as an Intel® Smart Video Recorder board, capable of being added to a general microprocessor-based personal computer (PC) system.

Host processor 116 may be any suitable means for controlling the operations of the special-purpose video processing board and is preferably an Intel® general purpose processor such as an Intel® i386™, i486™, or Pentium™ processor. Host memory 112 may be any suitable memory device used in conjunction with host processor 116 and is preferably a combination of random access memory (RAM) and read-only memory (ROM). System bus 114 may be any suitable digital signal transfer device and is preferably a high-speed data bus such as a PCI bus. Mass storage device 120 may be any suitable means for storing digital signals and is preferably a computer hard drive. Transmitter 118 may be any suitable means for transmitting digital signals to a remote receiver and is preferably a modem for transmitting digital signals over Public Switched Telephone Network (PSTN) lines. Those skilled in the art will understand that the encoded image signals may be transmitted using any suitable means of transmission such as telephone line (PSTN or Integrated Services Digital Network (ISDN)), RF antenna, local area network, or remote area network.

Display processor 122 may be any suitable device for converting digital image signals to analog image signals and is preferably implemented through a personal computer (PC)-based display system such as a VGA or SVGA system. Monitor 204 may be any means for displaying analog image signals and is preferably a VGA monitor.

Referring now to FIG. 2, decoding system 200 is preferably a general microprocessor-based personal computer (PC) system similar to the basic PC system of encoding system 100. In particular, host processor 208 may be any suitable means for decoding and scaling encoded image signals and is preferably an Intel® general purpose processor such as an intel® i386™, i486™, or Pentium™ processor. Host memory 214 may be any suitable memory device used in conjunction with host processor 208 and is preferably a combination of random access memory (RAM) and read-only memory (ROM).

System bus 206 may be any suitable digital signal transfer device and is preferably a high-speed data bus such as a PCI bus. Mass storage device 212 may be any suitable means for storing digital signals and is preferably a CD-ROM device. Receiver 210 may be any suitable means for receiving the digital signals transmitted by transmitter 118 of encoding system 100. Display processor 202 may be any suitable device for converting digital image signals to analog image signals and is preferably implemented through a personal computer (PC)-based display system such as a VGA or SVGA system. Monitor 204 may be any means for displaying analog image signals and is preferably a VGA monitor.

In a preferred embodiment, encoding system 100 of FIG. 1 and decoding system 200 of FIG. 2 are two distinct computer systems. In an alternative preferred embodiment of the present invention, a single computer system comprising all of the different components of systems 100 and 200 may be used to encoded and decoded video image signals.

In a preferred embodiment, encoding system 100 stores an encoded image database 130 in such a manner as to transmit low resolution image signals to decoding system 200 for efficient browsing of images of database 130 by a user of decoding system 200, as described in further detail hereinbelow.

Encoding Processing

Figure 3:
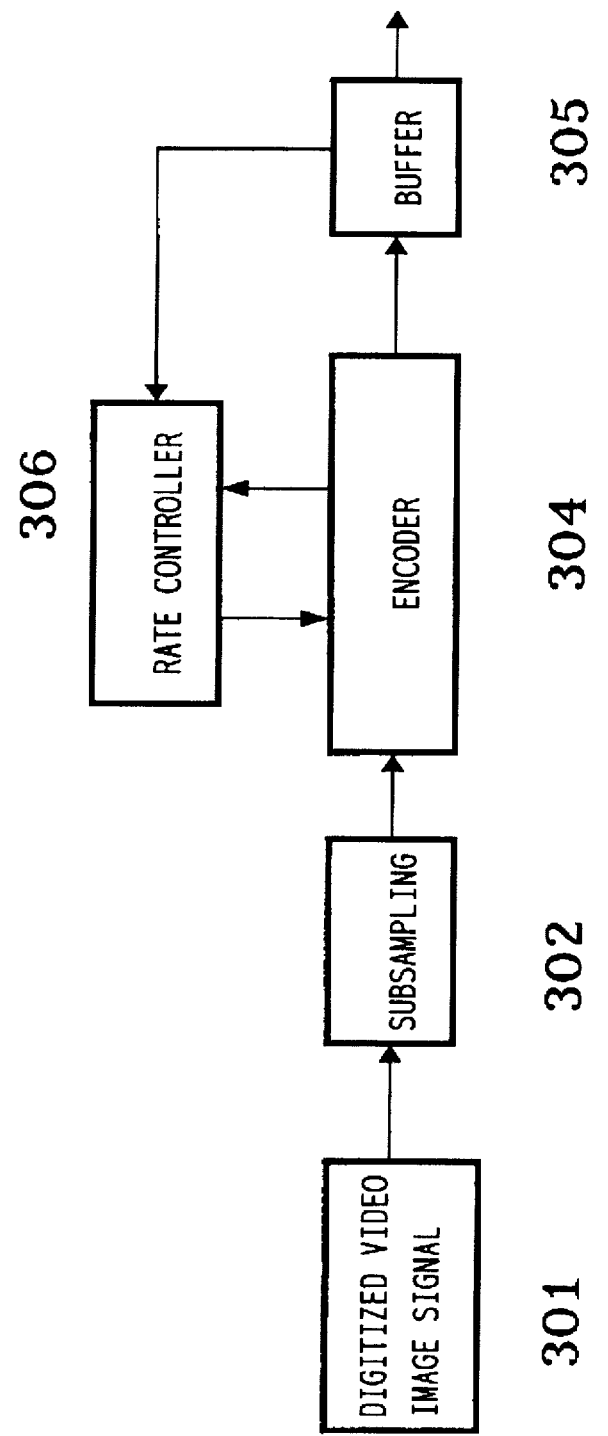
FIG. 3 is a process flow diagram of the encoding processing implemented by the encoding system of FIG. 1, in accordance with the present invention.

Referring now to FIG. 3, there is shown a process flow diagram of the encoding processing implemented by capture processor 104 and host processor 116 of FIG. 1, according to a preferred embodiment of the present invention. As shown in FIG. 3, capture processor 104 of FIG. 1 captures and digitizes video image signals to provide a digitized video image signal 301. As described above, video image signal 301 is a single picture of video data, which may be a still image or one of a plurality of pictures that constitute motion video. Capture processor 104 further performs the subsampling 302 of digitized image 301 to provide a subsampled, digitized video image comprising an array of pixels. At this point the pixel array is broken up into subimages or blocks of (8×8) pixels which are independently encoded further.

Encoder 304, also under control of rate controller 306, applies a transform such as a DCT to the subimage blocks and quantizes the DCT coefficients at a determined quantization level, as described in further detail below with reference to FIG. 4. Buffer 305 next receives the encoded bitstream representing the quantized DCT coefficients for transmission via the transmission medium to a destination source. It will be understood by those skilled in the art that, in a preferred embodiment, the functional elements of the process flow diagram of FIG. 3 are implemented by capture processor 104 and host processor 116 of FIG. 1. Those skilled in the art will further appreciate that additional processing may be applied to video image signal 301 at or after the encoder 304 stage, such as motion estimation, inter- or intrapicture encoding, and run-length encoding.

Rate controller 306 adjusts the bit rate by varying the quantization levels to be applied to the DCT coefficients of the transformed video image in the following-described manner. If a first encoded picture yields an encoded bitstream having more bits than the target bitstream size for that picture, a coarser (i.e., generally higher) quantization level may be applied to the next picture in order to reduce the bit rate so that the average bit rate approaches the target bitstream rate. Thus, as will be understood by those skilled in the art, a finer or coarser quantization level may be used to increase or decrease the target bitstream rate. In quantization, each DCT coefficient of the coefficients of a transformed (8×8) block is divided by the quantization factor in the corresponding (8×8) block position of the applicable quantization table, and then either rounded to the nearest number or the fractional part is truncated. When DCT coefficients are scaled down in this manner by dividing by a quantization factor, many of them become zeros, making them easier to represent with fewer bits, for example by run-length encoding applied to the bitstream after the encoder stage 304.

Each block may be guantized using different quantization levels. Typically, however, each (8×8) block within a macroblock is quantized at the same quantization level. As will be understood, a macroblock comprises a (16×16) array of Y or luminance pixels (also known as "luma pels") and two associated (8×8) blocks of chroma information, the U and V pixels. The (16×16) luma array is further divided into four (8×8) blocks. Other macroblock configurations are also possible, such as macroblocks comprising sixteen (8×8) blocks of the Y component plane, the corresponding (8×8) block of the U component plane, and the corresponding (8×8) block of the V component plane. Thus, quantization levels are usually chosen on a macroblock level, and this quantization level is applied to each block within the macroblock. The selection of which quantization level will be used is part of the bit rate control in the compression processing of the present invention.

As will be understood, when a DCT is performed on an (8×8) block of an image, the 64 coefficients are arranged in zig-zag fashion from the upper left corner of an (8×8) block down to the lower right corner, as described below in further detail with reference to FIG. 5. When arranged this way, the upper left corner of a block of DCT coefficients contain the DC component and lower frequency coefficients of the transformed block, while the lower right corner contains the higher frequency components of the transformed block. Larger quantization factors are grouped in the lower right regions of the each quantization table corresponding to a quantization level, while smaller divisors are grouped in the upper left region of the a table. In this manner higher frequency coefficients tend to be divided by larger divisors than the DC component and lower frequency components. The reason for this weighting is that loss of information in the higher frequency ranges is less visible to human visual perception than is loss of information in the lower frequency ranges.

In the present invention rate controller 306 preferably generates encoded images in accordance with the encode processing steps illustrated in FIG. 4.

Referring now to FIG. 4, there is shown a block diagram illustrating the encode processing of FIG. 3 in further detail, according to one embodiment of the present invention. A forward block transform 406 is applied to each block of the source image to generate transformed coefficients. In a preferred embodiment, transform 406 is a DCT transform. In alternative embodiments, transform 406 may be a different transform such as, but not limited to, a one- or two-dimensional slant transform, a one- or two-dimensional Haar transform, or a hybrid transform.

Quantizer 408 quantizes the transformed coefficients to generate quantized coefficients for the current block. Quantizer 408 divides each coefficient by a specified integer scale factor as described hereinabove.

Zig-zag run-length encoder 410 transforms the quantized coefficients into run-length encoded (RLE) data. In a preferred embodiment, the RLE data for each block of quantized coefficients consist of a sequence of run/val pairs, where each run/val pair is a non-zero quantized coefficient value followed by a value corresponding to a run of zero quantized coefficients. The run-length encoding follows a zig-zag pattern from the upper-left corner of the block of quantized coefficients (i.e., the DC coefficient of the DCT transform) to the lower-right corner (i.e., the highest frequency coefficient of the DCT transform), as illustrated in FIG. 5. Those skilled in the art will understand that using the zig-zag pattern provides a long run of zero coefficients for the last run of the block.

Huffman encoder 412 applies Huffman-type entropy (i.e., statistical or variable-length) coding to the RLE data to generate the encoded data for the current block or image, as described immediately below.

Huffman Encoding

A string of symbols (such as quantized discrete cosine transform (DCT) coefficients representative of an image) to be encoded is sometimes referred to as a message, which is to be encoded into code words. There is usually a statistical probability distribution among the symbols constituting the set of symbols constituting a message. Such symbols are often encoded and decoded using variable-length coding (VLC). Symbols are encoded into an encoded bitstream containing code words, and the association of symbols and code words is referred to as the code. In VLC techniques, code words of varying bit lengths are transmitted or stored for each symbol rather than transmitting or storing the symbol itself, with more common or probable symbols being represented by code words with a relatively small number of bits, and less probable symbols represented by code words with a relatively large number of bits. Because more common symbols need to be encoded more often than less probable symbols, efficiency in terms of encoded bits can be achieved if the code is constructed to accurately account for the statistics of the symbol set of the message(s) being encoded. Such encoding techniques are described in chapters 8 and 11 of Pennebaker & Mitchell, *JPEG: Still Image Data Compression Standard*, referenced above.

One method known in the prior art for statistically encoding symbols in this manner is the use of an optimal VLC such as a Huffman code. To use a Huffman code, a symbol set representative of typical messages to be encoded is put in order, from the most frequently occurring symbols to the least frequently occurring symbols. A Huffman code is then generated using, for example, the algorithm described at pages 77–85 of *Information Theory and Coding* by N. Abramson, McGraw Hill, 1963, pages 77–85 of which are incorporated by reference herein. The code is typically stored, in both encoders and decoders, in a code table. The Huffman code or tree is then used in both encoding symbols into code words and in decoding the code words back into symbols.

Conventional methods for decoding Huffman and other VLCs represent the codes as binary trees. Starting at the root of a tree, successive bits of a code word are received from the encoded bitstream. Depending on whether the bit is a 0 or 1, the decoder branches down to a node of the tree to the left or right, thereby traversing the tree. When a terminal node or leaf of the binary tree is reached, the traversal is complete and the decoded value of the symbol is determined from a table.

Decoding Processing

Referring now to FIG. 6, there is shown a block diagram of the decode processing of decoding system 200 of FIG. 2, according to one embodiment of the present invention. The decode processing of FIG. 6 reverses the encode processing of FIG. 4. In particular, Huffman decoder 602 applies Huffman-type entropy decoding to the encoded image signals to reconstruct the run-length encoded run/val data. Unzig-zag run-length decoder 604 transforms the RLE data into quantized coefficients. Inverse quantizer 606 dequantizes the quantized coefficients to generate dequantized coefficients. Inverse block transform 608 applies the inverse of forward block transform 406 to the dequantized coefficients to generate the decoded image.

Browsing

In a preferred embodiment the above-described encoding and decoding techniques are in compliance with the JPEG standard. This present invention provides for the efficient generation of a low-resolution version of a high resolution image compressed in a JPEG or similar compression format. This low-resolution version of the image can be used when browsing a database of documents containing many images in cases of limited transmission bandwidth. When the user identifies an image of interest, the user can request that the full resolution image be transmitted.

One method to generate a lower resolution version of a JPEG-encoded still image is to decode the image into a full color bitmap representation, filter and resample it at a lower resolution, and then recompress and transmit this lower resolution image. This involves the disadvantages referenced previously, however. The invention exploits certain features of two-dimensional transforms, such as the DCT, used in standards such as JPEG. In JPEG, each (8×8) pixel block from the image is transformed into an (8×8) frequency domain representation after which quantization and entropy encoding is applied, as explained above.

However, as will be appreciated, during this encoding the DCT operation already provides a breakdown of the image into multiple frequency bands. Thus, it is possible to reconstruct a lower resolution version of the image directly from this frequency domain representation. In particular, the DC component of each of the (8×8) frequency domain representation of each (8×8) pixel block may easily be extracted in order to construct a so-called "thumbnail" version of the image, for example which is one-eighth the resolution of the original image in both the horizontal and vertical dimension.

Therefore, in a preferred embodiment of the invention, efficient browsing of images is provided as follows. A user of decoding system 200 is provided with an option to view at least one image, which is stored remotely at encoding system 100. For example, an icon representing an image stored at encoding system 100 is shown on monitor 204 of decoding system 200. If the user selects the icon, decoding system 200 requests a thumbnail, i.e. low resolution, version of the corresponding image from encoding system 100. Encoding system 100 then transmits only the DC coefficients of the DCT coefficients of the image, i.e. one per block or macroblock, which are readily available because of the encode processing of FIG. 4. These DC coefficients are transmitted to decoding system 200 where they may be decoded. As will be understood, the image resulting therefrom will represent a low resolution version of the original image, and may be displayed on monitor 204. Although this thumbnail image is of relatively low quality and resolution, usually enough information will be present for the user to see roughly what the full-quality image will represent. Therefore, at this point, after viewing the low resolution version of the image, the user may request the high-quality version of the image, for example by selecting another option or icon as before. Alternatively, if the thumbnail image does not look interesting, the user can avoid requesting the high-quality version and thus avoid using the transmission bandwidth necessary to transmit the full-quality encoded image. At this point the user may browse another image in the same fashion as before by selecting another icon representing another image.

In a preferred embodiment of the present invention, decoding system 200 uses a smoothing filter to display the lower-resolution thumbnail image so that blockiness artifacts are reduced.

In this manner, the present invention makes video databases easier to use given the limited bandwidths available to most computer uses, particularly for the use of home computers to tap into internet and other on-line information services. By allowing users to browse low resolution images before requesting the transmission of high resolution encoded signals, the user can determine which images are likely to be interesting or useful enough to warrant the transmission of further data over the communications bandwidth.

Transmitting the Thumbnail Image

As will be understood, when encoding system 100 is requested to send the thumbnail version of an image, there are several ways in which this may be accomplished. Referring once more to FIG. 4, data may be extracted from various stages of the encode processing to transmit only a subset of the DCT coefficients to decoding system 200. In a preferred embodiment, encoded image signals produced at step 412 are stored as encoded images in database 130 of encoding system 100. When a thumbnail version of a given encoded image stored in database 130 is requested to be transmitted to decoding system 200, encoding system may simply reverse the huffman encoding, run-length encoding, and zig-zag ordering of steps 412 and 410 to provide the quantized DCT coefficients, as shown in steps 414–418. The DC coefficients may then be selected and transmitted to decoding system 200. As will be understood, this subset of guantized DCT coefficients may be further encoded before transmitting, for example run-length and Huffman encoded.

Alternatively, as will be appreciated, encoder 408 can also reverse the quantization of step 408 to provide the original set of DCT coefficients, and transmit only the DC coefficients of this set, to decoding system 200.

As will further be understood by those skilled in the art, in an alternative preferred embodiment, during the original encoding of an image in the encode processing of FIG. 4, both a thumbnail image and the encoded image may be generated and stored in database 130. As shown by the dashed line after step 408, the guantized coefficients can be divided at this point for both the full quality image and the thumbnail image. Thus, when the thumbnail image is requested, it may be retrieved directly from database 130 and transmitted to decoding system 200.

It will further be understood that thumbnail images of varying levels of quality may be created by selecting subsets of the DCT coefficients other than solely the DC DCT coefficients. For example, an even lower quality thumbnail image may be achieved by transmitting only one of every four DC DCT coefficients, or an equivalent average. A higher quality thumbnail image may be achieved by encoding the DC and first order AC DCT coefficients, and so on. Where more than one such level of thumbnail images is possible, the user of decoding system 200 may be presented with an option to selected the thumbnail image of the desired quality, although higher quality thumbnail images will require, in general, more communications bandwidth to transmit.

It will further be understood that, in alternative preferred embodiments, the request for a thumbnail image may be generated automatically by decoding system 200 whenever a user selects an image for viewing, or encoding system 100 can be configured to always first transmit the thumbnail image followed by the high quality image if requested.

Transmitting the Full-Quality Image

After receiving and viewing the thumbnail image, the user may request the full quality version of the image, or a higher quality version, as described above. In one embodiment, encoding system 100 simply transmits the entire full quality encoded image. However, in alternative preferred embodiments encoding system 100 recognizes that a portion of the DCT coefficients have already been transmitted with the thumbnail image, and thus transmits only the remaining DCT coefficients to allow decoding system 200 to build the full quality image from the already-received thumbnail version.

Motion Video Sequences

As will be understood, the above-described invention may also be utilized to provide a thumbnail image of the first frame of a sequence of video frames, to allow the user to browse a thumbnail image of the first frame to decide whether to receive the entire video sequence. Alternatively, a "thumbnail video sequence" may be transmitted to allow browsing of the video sequence itself, which comprises a thumbnail version of each intracoded frame within the video sequence. This would allow the viewer to efficiently preview the movie before downloading the entire sequence. Those skilled in the art will realize how to adapt the above-described techniques to such a motion video environment, such as the ISO/IEC 11172 Moving Pictures Experts Group-1 (MPEG-1) standard, the entirety of which is incorporated herein by reference.

It will be understood that various changes in the details, materials, and arrangements of the parts which have been described and illustrated above in order to explain the nature of this invention may be made by those skilled in the art without departing from the principle and scope of the invention as recited in the following claims.

What is claimed is:

1. A computer-implemented method for browsing encoded images, comprising the steps of:

(a) encoding at least one image with an encoding system to provide at least one encoded image, wherein the encoding comprises the step of transforming an image of the at least one image in accordance with a transform to provide a plurality of transform coefficients;

(b) quantizing the plurality of transform coefficients to form a plurality of quantized transform coefficients:

(c) selecting a subset of the plurality of quantized transform coefficients corresponding to a selected image to form a subset of quantized transform coefficients; and (d) transmitting the subset of quantized transform coefficients to a remote computer system, wherein the subset of quantized transform coefficients corresponds to a low quality version of the selected image, the subset of quantized transform coefficients comprising the DC components and the first-order AC components of the plurality of quantized transform coefficients.

2. The method of claim 1, wherein the selected image is selected in accordance with a selection of a user of the remote computer system, the method further comprising the step of:

(e) transmitting encoded image signals corresponding to a high quality version of the selected image to the remote computer system in response to a request by the user of the remote computer system.

3. The method of claim 2, wherein the encoded image signals comprise the plurality of quantized transform coefficients.

4. The method of claim 2, wherein the encoded image signals comprise quantized transform coefficients of the plurality of quantized transform coefficients other than the subset of quantized transform coefficients.

5. An apparatus for browsing encoded images, comprising:

(a) an encoder for encoding at least one image with an encoding apparatus to provide at least one encoded image, the encoder comprising means for transforming an image of the at least one image in accordance with a transform to provide a plurality of transform coefficients;

(b) means for quantizing the plurality of transform coefficients to form a plurality of quantized transform coefficients;

(c) means for selecting a subset of the plurality of quantized transform coefficients corresponding to a selected image to form a subset of quantized transform coefficients; and (d) means for transmitting the subset of quantized transform coefficients to a remote computer system, wherein the subset of quantized transform coefficients corresponds to a low quality version of the selected image, the subset of quantized transform coefficients comprising the DC components and the first-order AC components of the plurality of quantized transform coefficients.

6. The apparatus of claim 5, wherein the selected image is selected in accordance with a selection of a user of the remote computer apparatus, the apparatus further comprising:

(e) means for transmitting encoded image signals corresponding to a high quality version of the selected image to the remote computer apparatus in response to a request by the user of the remote computer apparatus.

7. The apparatus of claim 6, wherein the encoded image signals comprise the plurality of quantized transform coefficients.

8. The apparatus of claim 6, wherein the encoded image signals comprise quantized transform coefficients of the plurality of quantized transform coefficients other than the subset of quantized transform coefficients.

9. A computer-readable memory device having stored thereon a plurality of instructions, wherein the plurality of instructions, when executed by a processor of a source computer, cause the processor to perform the steps of:

(a) encoding at least one image with an encoding system to provide at least one encoded image, wherein the encoding comprises the step of transforming an image of the at least one image in accordance with a transform to provide a plurality of transform coefficients;

(b) quantizing the plurality of transform coefficients to form a plurality of quantized transform coefficients;

(c) selecting a subset of the plurality of quantized transform coefficients corresponding to a selected image to form a subset of quantized transform coefficients; and (d) transmitting the subset of quantized transform coefficients to a remote computer system, wherein the subset of quantized transform coefficients corresponds to a low quality version of the selected image, the subset of quantized transform coefficients comprising the DC components and the first-order AC components of the plurality of quantized transform coefficients.

10. The computer-readable memory device of claim 9, wherein the selected image is selected in accordance with a selection of a user of the remote computer system and the plurality of instructions cause the processor to perform the step of:

(e) transmitting encoded image signals corresponding to a high quality version of the selected image to the remote computer system in response to a request by the user of the remote computer system.

11. The computer-readable memory device of claim 10, wherein the encoded image signals comprise the plurality of quantized transform coefficients.

12. The computer-readable memory device of claim 10, wherein the encoded image signals comprise quantized transform coefficients of the plurality of quantized transform coefficients other than the subset of quantized transform coefficients.

13. A computer-implemented method for browsing encoded images, comprising the steps of:

(a) encoding at least one image with an encoding system to provide at least one encoded image, wherein the encoding comprises the step of transforming an image of the at least one image in accordance with a transform to provide a plurality of transform coefficients; step (a) comprising the steps of:

(1) quantizing the plurality of transform coefficients to provide a plurality of quantized transform coefficients;

(2) run-length encoding the plurality of quantized transform coefficients; and (3) Huffman encoding the run-length-encoded plurality of quantized transform coefficients; and (b) transmitting a subset of the plurality of quantized transform coefficients corresponding to a selected image to a remote computer system, wherein the subset corresponds to a low quality version of the selected image; step (b) comprising the steps of:

(1) reversing the Huffman encoding of step (a)(3) and the run-length encoding of step (a)(2) to provide the plurality of quantized transform coefficients; and (2) selecting selected quantized transform coefficients of the plurality of quantized transform coefficients to form the subset of the plurality of transform coefficients.

14. The method of claim 13, wherein the selected image is selected in accordance with a selection of a user of the remote computer system, the method further comprising the step of:

(c) transmitting encoded image signals corresponding to a high quality version of the selected image to the remote computer system in response to a request by the user of the remote computer system.

15. The method of claim 14, wherein the encoded image signals comprise the plurality of transform coefficients.

16. The method of claim 14, wherein the encoded image signals comprise transform coefficients of the plurality of transform coefficients other than the subset of the plurality of transform coefficients.

17. An apparatus for browsing encoded images, comprising:
- (a) an encoder for encoding at least one image with an encoding apparatus to provide at least one encoded image, the encoder comprising means for transforming an image of the at least one image in accordance with a transform to provide a plurality of transform coefficients; the encoder comprising:
  - (1) means for quantizing the plurality of transform coefficients to provide a plurality of quantized transform coefficients;
  - (2) means for run-length encoding the plurality of quantized transform coefficients; and
  - (3) means for Huffman encoding the run-length-encoded plurality of quantized transform coefficients; and
- (b) means for transmitting a subset of the plurality of transform coefficients corresponding to a selected image to a remote computer apparatus, wherein the subset of the plurality of transform coefficients corresponds to a low quality version of the selected image; means (b) comprising:
  - (1) means reversing the Huffman encoding of means (a)(3) and the run-length encoding of means (a)(2) to provide the plurality of quantized transform coefficients; and
  - (2) means for selecting selected quantized transform coefficients of the plurality of quantized transform coefficients to form the subset of the plurality of transform coefficients.

18. The apparatus of claim 17, wherein the selected image is selected in accordance with a selection of a user of the remote computer system, the apparatus further comprising:
- (c) means for transmitting encoded image signals corresponding to a high quality version of the selected image to the remote computer system in response to a request by the user of the remote computer system.

19. The apparatus of claim 18, wherein the encoded image signals comprise the plurality of transform coefficients.

20. The apparatus of claim 18, wherein the encoded image signals comprise transform coefficients of the plurality of transform coefficients other than the subset of the plurality of transform coefficients.

21. A computer-readable memory device having stored thereon a plurality of instructions, wherein the plurality of instructions, when executed by a processor of a source computer, cause the processor to perform the steps of:
- (a) encoding at least one image with an encoding system to provide at least one encoded image, wherein the encoding comprises the step of transforming an image of the at least one image in accordance with a transform to provide a plurality of transform coefficients; step (a) comprising the steps of:
  - (1) quantizing the plurality of transform coefficients to provide a plurality of quantized transform coefficients;
  - (2) run-length encoding the plurality of quantized transform coefficients; and
  - (3) Huffman encoding the run-length-encoded plurality of quantized transform coefficients; and
- (b) transmitting a subset of the plurality of quantized transform coefficients corresponding to a selected image to a remote computer system, wherein the subset corresponds to a low quality version of the selected image; step (b) comprising the steps of:
  - (1) reversing the Huffman encoding of step (a)(3) and the run-length encoding of step (a)(2) to provide the plurality of quantized transform coefficients; and
  - (2) selecting selected quantized transform coefficients of the plurality of quantized transform coefficients to form the subset of the plurality of transform coefficients.

22. The computer-readable memory device of claim 21, wherein the selected image is selected in accordance with a selection of a user of the remote computer system and the plurality of instructions cause the processor to perform the step of:
- (c) transmitting encoded image signals corresponding to a high quality version of the selected image to the remote computer system in response to a request by the user of the remote computer system.

23. The computer-readable memory device of claim 22, wherein the encoded image signals comprise the plurality of transform coefficients.

24. The computer-readable memory device of claim 22, wherein the encoded image signals comprise transform coefficients of the plurality of transform coefficients other than the subset of the plurality of transform coefficients.

* * * * *